Fig. 1
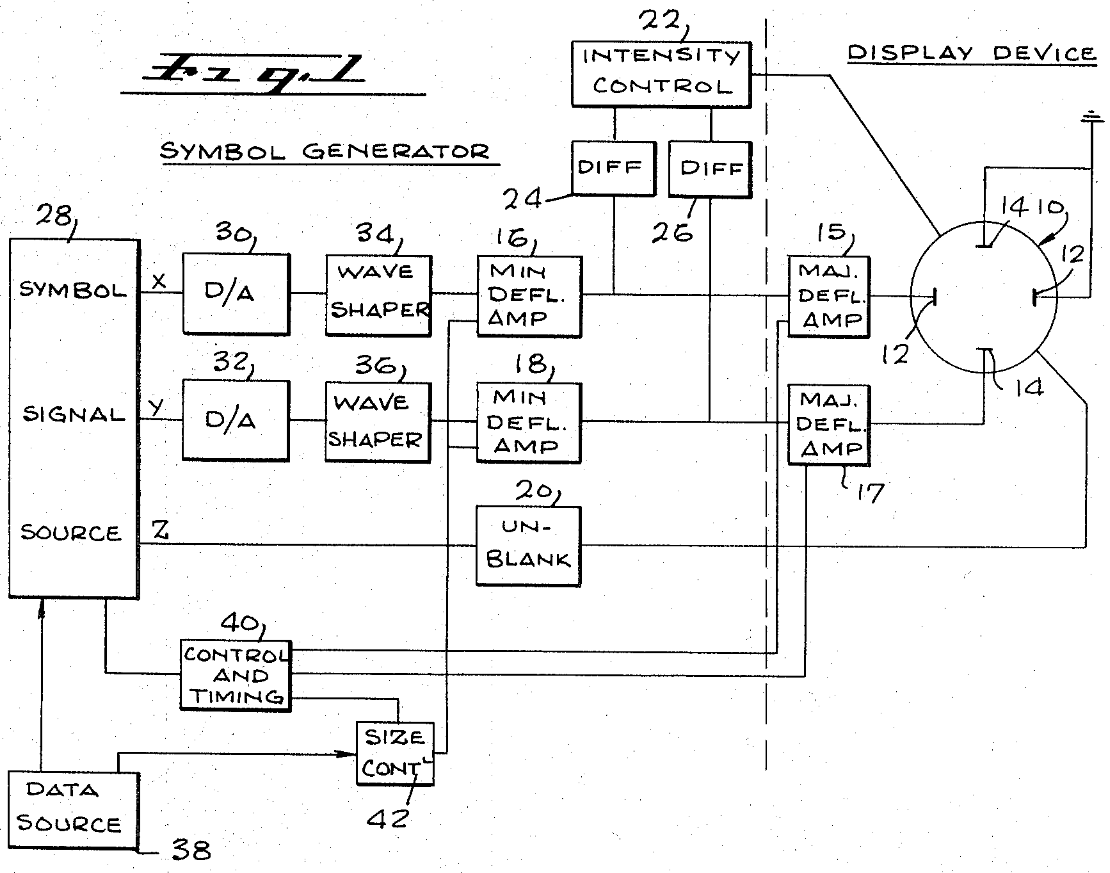
Fig. 2b
| | X | Y | Z |
|---|---|---|---|
| t0 | 2 | 2 | OFF |
| t1 | 2 | 6 | ON |
| t2 | 2 | 6 | " |
| t3 | 5 | 6 | " |
| t4 | 5 | 4 | " |
| t5 | 2 | 4 | " |
| t6 | 2 | 4 | " |
| t7 | 5 | 4 | OFF |
| t8 | 5 | 2 | ON |
| t9 | 2 | 2 | " |
| t10 | 2 | 2 | " |
| t11 | | | OFF |
Fig. 2a
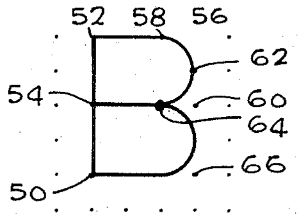
MARTIN C. HENDERSON
ROBERT A. KOSTER
INVENTORS
BY Lindenberg + Freilich
ATTORNEYS FIG. 2c
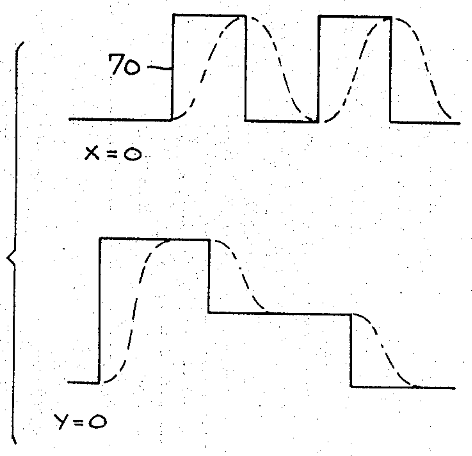
FIG. 5a
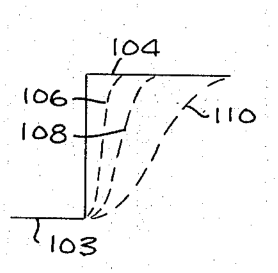
FIG. 5b
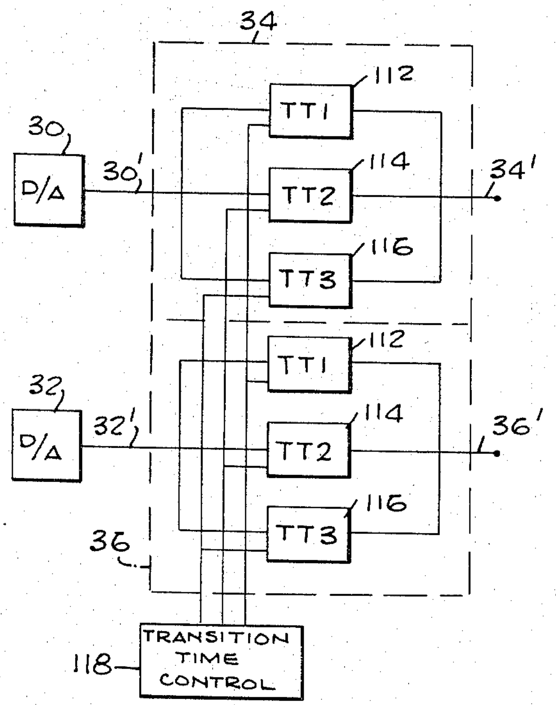
FIG. 6b
| | X | Y | Z | TT |
|---|---|---|---|---|
| t0 | 2 | 2 | OFF | |
| t1 | 2 | 6 | " | 1 |
| t2 | 3 | 2 | ON | 4 |
| t3 | 3 | 2 | " | 4 |
| t4 | 3 | 2 | " | 4 |
| t5 | 3 | 2 | " | 4 |
| t6 | 4 | 4 | " | 2 |
| t7 | 4 | 4 | " | 2 |
| t8 | 5 | 2 | " | 2 |
| t9 | 5 | 2 | " | 2 |
| t10 | 6 | 6 | " | 4 |
| t11 | 6 | 6 | " | 4 |
| t12 | 6 | 6 | " | 4 |
| t13 | 6 | 6 | " | 4 |
| t14 | | | END OF OFF-SYMB. | |
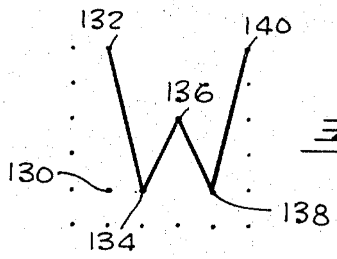
FIG. 6a
MARTIN C. HENDERSON
ROBERT A. KOSTER
INVENTORS
BY Lindenberg + Freilich
ATTORNEYS

DISPLAY APPARATUS

Filed Feb. 15, 1967 6 Sheets-Sheet 3

MARTIN C. HENDERSON
ROBERT A. KOSTER
INVENTORS

BY Lindenberg + Freilich

ATTORNEYS

MARTIN C. HENDERSON
ROBERT A. KOSTER
INVENTORS

BY Lindenberg + Freilich
ATTORNEYS

MARTIN C HENDERSON
ROBERT A. KOSTER
INVENTORS

BY Lindenberg + Freilich

ATTORNEYS

DISPLAY APPARATUS

Filed Feb. 15, 1967

MARTIN C. HENDERSON
ROBERT A. KOSTER
INVENTORS

BY Lindenberg & Freilich

ATTORNEYS

United States Patent Office 3,555,538

Patented Jan. 12, 1971

3,555,538

DISPLAY APPARATUS

Martin C. Henderson and Robert A. Koster, Canoga Park, Calif., assignors to The Bunker-Ramo Corporation, Canoga Park, Calif., a corporation of Delaware Filed Feb. 15, 1967, Ser. No. 616,368

Int. Cl. H01j 29/70

U.S. Cl. 340—324 15 Claims

ABSTRACT OF THE DISCLOSURE

An apparatus for causing a display device, e.g., a cathode ray tube, to display symbols and words in response to digital input codes. The symbols are drawn by successively deflecting the tube beam toward selected points on a display matrix in accordance with information read, during successive time periods, from a memory into which pre-wired information is selectively written. The information read can also define beam transition time, symbol width, and unblanking.

BACKGROUND OF THE INVENTION

It is often desirable that display devices be provided for use with digital data processing equipment for displaying output data. Most such known display devices include a cathode ray tube in which the beam is controlled to selectively draw any one of several alphanumeric or other symbols. In the design of such display devices, several characteristics are significant. For example, the symbols displayed should be pleasing in appearance, clear, and unambiguous. It is also important that the restrictions on symbol design be minimal, and that it be relatively easy to modify the shape of the symbol when desired. In addition, it should be possible to rapidly produce a display of many symbols to be refreshed at a flicker-free rate. The bandwidth of the signals used in displaying the symbols should be kept low to thus allow relatively simple deflection and video amplifiers to be employed. Further, the writing beam should be unblanked for a large fraction of the time, i.e., a high duty factor to thus provide a bright display.

Although several different types of symbol generation and display apparatus are known in the prior art, no specific type is the best in all respects. For example, raster type symbol generators allow great flexibility in symbol design but, however require high video bandwidth, and for typical alphanumeric symbols have a low duty factor. Typical raster type symbol generators also are inflexible in that symbols cannot easily be modified after the devices have been constructed.

Dot type symbol generators, on the other hand, are quite flexible in original symbol design and allow easy alteration of symbols to meet changed needs. However, the limited number of discrete dots used to define a symbol is found less pleasing by many viewers. The video bandwidth requirements tend to be less than in a raster type generator of equivalent speed and resolution, but the deflection amplifier bandwidth tends to be greater.

Stroke or line type generators produce symbols by tracing out standard patterns by unblanking appropriate lines. For a given font of symbols, only a comparatively few patterns are used. Some modification of the straight strokes is provided in some types of generators, but the symbols generally tend to be displeasingly angular. Bandwidth requirements are comparable to those of the dot type generator.

U.S. patent application Ser. No. 488,373, filed by Martin C. Henderson on Sept. 20, 1965, now Pat. No. 3,483,547 and assigned to the same assignee as the present application, discloses an improved display apparatus which has some attributes normally characteristic of a dot type generator, but which in addition is capable of drawing lines between dots to thus permit the formation of symbols having a more pleasing appearance than is provided by conventional dot type generators. Briefly, in accordance with one aspect of the cited patent application (reference to which is not necessary to the understanding of the present invention as set forth herein), more pleasing symbols are produced by sweeping the beam between dots or points of a matrix of display points while leaving the beam unblanked to thus draw lines between the points. In accordance with another important aspect of the cited patent application, the rate of movement of the beam is varied as it is deflected along a straight line between two end points such that the beam is moving relatively rapidly between the end points but relatively slowly in the vicinity of the end points, thus reducing the deflection amplifier bandwidth requirements. In accordance with a still further aspect of the cited patent application, curved lines are selectively drawn by changing the forces deflecting the beam while it is moving between first and second target points.

SUMMARY OF THE INVENTION

In accordance with the present invention, an improved display apparatus is provided which incorporates many aspects of the apparatus of the aforecited patent application, but which in addition introduces several significant features enabling even more pleasing and complex symbols to be easily drawn.

Briefly, in accordance with one aspect of the present invention, symbols are drawn by deflecting the beam toward an appropriate target point on a display point matrix during each of a plurality of successive time periods. In the preferred embodiment of the invention, information defining the point toward which the beam should be deflected during each period is read out of a magnetic core memory. The information defining the symbol to be displayed is previously written into the core memory by energizing the one of a plurality of "symbol write" lines unique to the symbol to be displayed. Each symbol write line is uniquely threaded through the memory to define the sequence of display points describing the symbol corresponding thereto.

In addition to permitting each symbol write line to write into the memory the display points to which the beam should be successively deflected, in accordance with a further feature of the present invention, other information is also written into the memory as a consequence of energizing a symbol write line. Thus, for example, information to control beam unblanking can be written into and read from the memory in order to introduce selective discontinuities in the symbol. In addition, information to control symbol width, i.e., the space along a line dedicated to the display of a symbol, can be read from the memory and utilized to control the deflection amplifiers. This enables a more pleasing, justified like, display to be provided.

Also, in accordance with a further feature of the present invention, means are provided for enabling the beam transition time to be varied. That is, as has been demonstrated into the aforecited patent application, curved lines can be drawn by defining a beam transition time equal to two time periods, meaning that if a beam is deflected from one point toward another in a particular time period, it will not arrive at its destination point during that time period but will actually require another full time period to reach the destination point. By changing the defined destination point at the end of the first time period, the beam can be deflected along a desired curve. The present invention enables different length transition times to be defined in order to optimally describe each symbol. In the preferred embodiment of the invention, the information defining the selected transition time for each of the successive time periods is written into the memory by the symbol write line corresponding to that symbol.

In order to enable some larger and more complex symbols to be drawn than are permitted by the number of time periods required to draw most symbols, an additional feature of the present invention comprises a capability of recycling through the memory to obtain additional information to continue a symbol. Thus, for example, in the preferred embodiment of the invention, sixteen successive time periods are sufficient to draw most symbols. However, some complex or large symbols which it may be desired to draw may require more than sixteen time periods. In order to accomplish this, during an initial memory cycle (sixteen time periods) in which the first part of a symbol is drawn, information is read from the memory indicating another symbol write line to be energized prior to executing another memory cycle.

In accordance with a further feature of the present invention, the recycling feature is employed to permit a word, i.e., a sequence of symbols, to be displayed in response to an input code.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 is a block diagram of a display system in which the teachings of the present invention can be incorporated;

FIG. 2(*a*) illustrates a typical symbol to be displayed;

FIG. 2(*b*) illustrates in tabular form the beam control information and the display points toward which the cathode ray tube beam should be selectively deflected to describe the symbol of FIG. 2(*a*);

FIG. 2(*c*) illustrates deflection signal waveforms defined by FIG. 2(*b*);

FIG. 5(*a*) illustrates a typical sharp transition in deflection signal level and a plurality of modified ramp signals having different rise times which can be selectively employed in place of the sharp transition;

FIG. 5(*b*) is a block diagram illustrating the manner in which different transition times are selected;

FIG. 6(*b*) illustrates in tabular form the points toward which the cathode ray tube beam should be selectively deflected to describe the symbol of FIG. 6(*a*) and in addition illustrates the transition times employed;

FIGS. 6(*c*) and 6(*d*) illustrate deflection signal waveforms corresponding to the information set forth in tabular form in FIG. 6(*b*);

DESCRIPTION OF THE PREFERRED EMBODIMENTS

Figure 3:
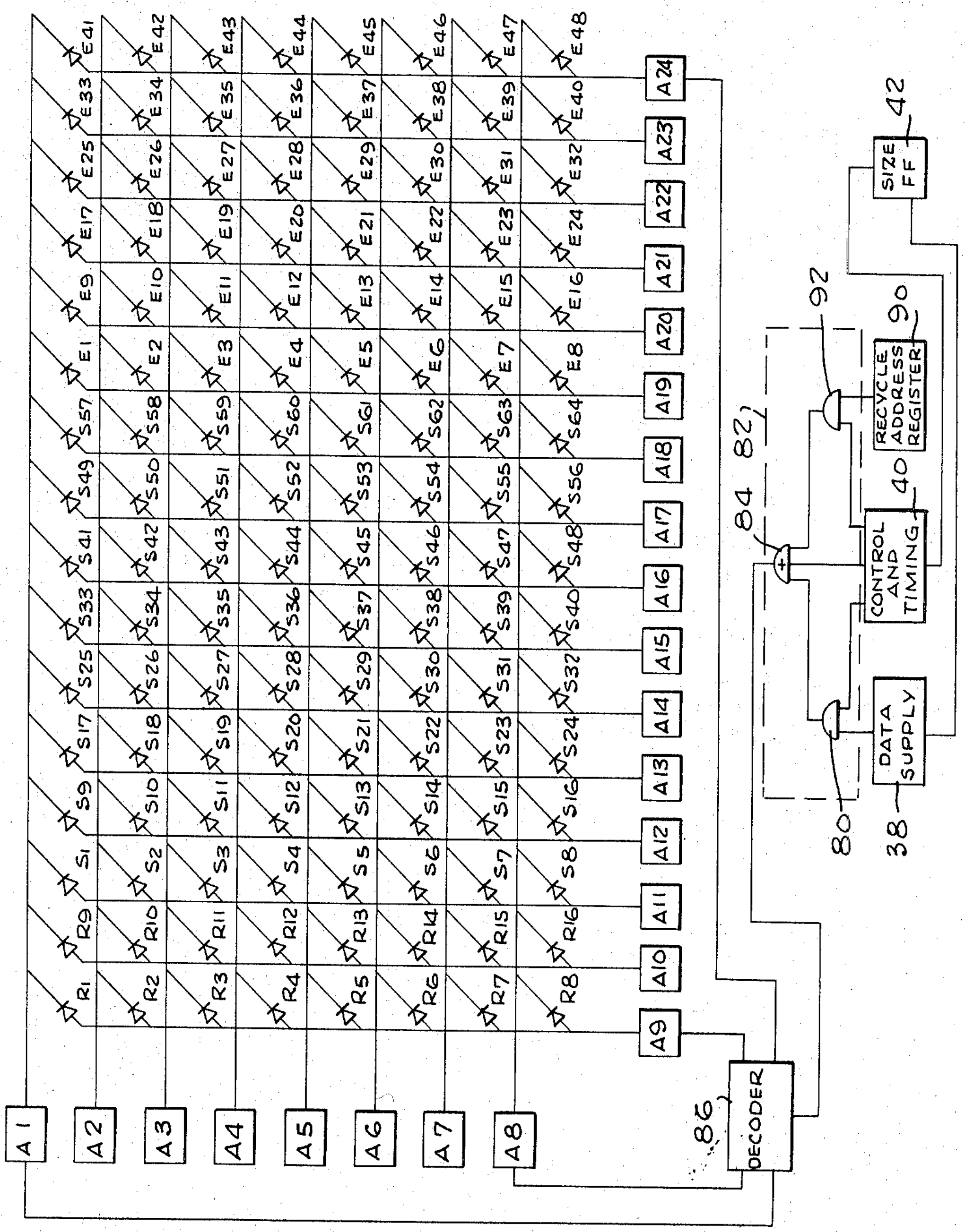
FIG. 3 comprises a block diagram illustrating a portion of a symbol signal source in accordance with the present invention.

Attention is now called to FIG. 1 of the drawings, which illustrates a typical display system in which the teachings of the present invention can be advantageously employed. The display system illustrated in FIG. 1 is generally similar to the display system disclosed in the aforecited patent application and is comprised of a symbol generator portion and a display device portion. The improvements in accordance with the present invention reside primarily in the symbol signal source of the symbol generator portion.

Although several different specific display devices can be employed, it will be assumed herein that the display device comprises a cathode ray tube 10 having means for generating an electron beam which can be accelerated to impinge against a target to thus form a light spot which may hereinafter merely be referred to as a visible means. It is well known to deflect the beam to move the light spot to describe various symbols. Due to the persistence of the light spot, the actual beam movement is not visually recognizable by an observer. Rather, the symbol described by the light spot appears to be continuously illuminated.

The beam within the cathode ray tube 10 can be moved by applying appropriate accelerating voltages across various deflection plates. Thus, the potential applied between the horizontal deflection plates 12 determines the distance a beam is displaced horizontally from a center or quiescent position. Similarly, a potential applied between the deflection plates 14 determines the vertical displacement of the beam from a center position. As shown in FIG. 1, deflection signals are applied to the horizontal and vertical deflection plates 12 and 14 by major deflection amplifiers 15 and 17 which establish the gross beam position. Minor deflection amplifiers 16 and 18 are connected to the amplifiers 15 and 17 and modulate the gross beam position to cause the beam to describe selected symbols. The horizontal and vertical deflection signals may hereinafter be respectively referred to as the X and Y deflection signals. A Z signal is provided to the cathode ray tube 10 from unblanking means 20 and controls the unblanking and blanking of the light spot. Thus, when the unblanking means 20 defines an OFF state, the beam does not create a visible light spot on the target. In addition to the X, Y, and Z signals, an intensity control means 22 provides a signal to the cathode ray tube which is responsive to the speed of movement of the beam; that is, as should be appreciated, if the beam is moved more rapidly across the target, its intensity will be less than if it traverses the same path at a slower speed. Accordingly, it is oftentimes desirable, as is explained in the aforecited patent application, to provide an intensity control means 22 which increases the light spot intensity as the beam is moved more rapidly. Inasmuch as the speed of the beam movement depends upon the transitions of the X and Y signals, the speed can be sensed by differentiating the outputs of the amplifiers 16 and 18 in differentiators 24 and 26. The outputs of the differentiators 24 and 26 can then be processed by the intensity control means 22 to vary the beam intensity.

As is described in the aforecited patent application, the signals provided to the amplifiers 16 and 18 and unblanking means 20 are derived from some symbol signal source 28. The symbol signal source provides digital X and Y signals which define points on a matrix of display points to be more specifically explained in conjunction with FIG. 2. In any event, the digital X and Y signals are converted by digital-to-analog converters 30 and 32 to analog signals which are then processed by waveshaping means 34 and 36, which preferably comprise delay lines, prior to being applied to the amplifiers 16 and 18. In accordance with a preferred embodiment of the invention, the symbol signal source also supplies a Z signal to the unblanking means 20.

The symbol signal source 28 is responsive to a data source 38 which provides a code defining a particular symbol to be displayed. The symbol signal source is controlled by a control and timing device 40. Means can also be provided for defining the size of the symbol to be displayed. Thus, the data source 38 controls a size control means 42, which in turn controls the gain of the amplifiers 16 and 18 to thereby establish the size of a displayed symbol.

In order to more clearly understand how a system of the type shown in FIG. 1 and described in the aforecited patent application operates, attention is now called to FIGS. 2(*a*) to 2(*c*), which describe the X, Y, and Z signals provided by the symbol signal source 28 required to display the symbol "B." More particularly, consider that each symbol is to be displayed within a matrix of display points. Arbitrarily, a matrix of 6 x 6 has been assumed herein. It should be recognized, however, that other size display matrices can also be utilized in accordance with the present invention. For example, in the aforecited patent application, a 15 x 15 display point matrix was assumed. Prior to considering the specific signals required to trace the symbol "B," it is pointed out that the symbol is drawn by defining a plurality of successive time periods and designating, during each time period, a point in the matrix toward which the beam should be deflected. In order to draw curved lines, the destination point of the beam is sometimes modified prior to the beam actually reaching the initial destination point. Thus, as taught in the aforecited patent application, the beam can have a transition time equal to two time periods such that it will take the beam two time periods to reach a designated destination point. If the designation of this point is maintained for only one time period, then the beam can be steered toward another point after the first time period to thus move it along a curvilinear path.

As shown in FIG. 2(*b*), let it be initially assumed that at time $t_0$ the beam is at an arbitrarily selected starting point 50 ($X=2$, $Y=2$) on the 6 x 6 display matrix. At this time, the beam should be blanked, and therefore the Z signal in FIG. 2(*b*) at time $t_0$ is OFF. At time $t_1$ the point 52 ($X=2$, $Y=6$) is defined by the symbol signal source 28, and the beam is unblanked as indicated by the Z signal. The beam therefore starts to traverse the path toward the destination point 52 and at the end of time period $t_1$ will be midway along the path at point 54. Inasmuch as time period $t_2$ defines the same destination point 52 as time period $t_1$, at the end of period $t_2$ the beam will actually reach point 52. At time $t_3$ the beam is deflected toward point 56 ($X=5$, $Y=6$). Inasmuch as the beam transition time in FIG. 2 has been assumed to be equal to two time periods, at the end of time period $t_3$ the beam will be at point 58. It can be noted from FIG. 2(*b*) that during time period $t_4$ the destination point is changed to point 60 ($X=5$, $Y=4$). As a consequence, the beam will veer downwardly, and at the end of time period $t_4$ will be approximately at point 62. If thereafter, as indicated, the destination point is changed to point 54 ($X=2$, $Y=4$), the beam will veer to the left toward point 54. Inasmuch as the coordinates of point 54 are maintained for two time periods, at the end of time period $t_6$ the beam will arrive at point 54. In order to complete the lower half of the "B," the beam is then again deflected toward point 60 ($X=5$, $Y=4$), but is blanked (note the Z signal defines an OFF state) in order not to retraverse the central portion of the "B." At the end of time period $t_7$ the beam will be at point 64 and will then be unblanked and directed toward point 66 ($X=5$, $Y=2$) during time period $t_8$. It will not, however, reach this point inasmuch as during time period $t_9$ the destination point 50 ($X=2$, $Y=2$) is defined. At the end of time period $t_{10}$ the beam will reach point 50.

The curvilinear lines can be drawn as shown in FIG. 2(*a*) as a consequence of moving the beam slowly at both its starting and end points and rapidly between these points. This is done by converting sharp signal transitions into modified ramp signals approximating a portion of a sine wave as, for example, from $-\pi/2$ to $+\pi/2$. More particularly, as shown in FIG. 2(*c*), the X signal provided by the symbol signal source 28 is maintained at a level $X=2$ until the start of period $t_3$. The X signal then assumes the level $X=5$ by virtue of a sharp signal transition 70. This level is maintained until period $t_5$ when the signal again assumes a level $X=2$. At time period $t_7$ the signal again assumes a level $X=5$, and at time $t_9$ assumes a level $X=2$. These level changes, as shown in solid lines in FIG. 2(*c*), all constitute sharp signal transitions. These sharp signal transitions are converted by the waveshaping means (e.g., delay lines) 34 and 36 shown in FIG. 1 to the modified signal ramps shown in dotted lines in FIG. 2(*c*). Thus, at the end of time period $t_3$ the beam should not in fact have arrived at the point 56 ($X=5$, $Y=6$), as previously discussed. By looking at the dotted line portions of the curves of FIG. 2(*c*), it should be apparent that at the end of period $t_3$ the beam will approximately be at $X=3\frac{1}{2}$ and be traveling at a maximum velocity in a horizontal direction and at $Y=6$ and having a substantially zero velocity in a vertical direction. As a consequence, as the destination point is changed in time period $t_4$, the beam veers along a substantially smooth path toward point 60; that is, the point defined by the coordinates during time period $t_4$.

Whereas the aforecited patent application contemplated in its preferred embodiment employing an impedance string in its symbol signal source 28 to generate the solid line signals of FIG. 2(*c*), the present invention is directed to an improved symbol signal source apparatus. The symbol source 28 of the present invention employs a digital memory which in the preferred embodiment comprises a magnetic core memory matrix. Briefly, in response to the identification of a symbol by data provided by the data source 38, a particular one of a plurality of symbol write lines fixedly threaded through the memory is energized to write information into the memory unique to the energized symbol write line, which information depicts the manner in which the beam should be moved to describe the designated symbol. More particularly, the information written into the memory in response to the energization of a symbol write line is analogous to the information set forth in tabular form in FIG. 2(*b*). After this information is written into the memory, portions of it are read out during each of a plurality of successive time periods. It will be assumed that sixteen successive time periods are sufficient to describe most symbols. Thus, as will be seen hereinafter, the core memory preferably is comprised of sixteen core rows, with each row being read during a different time period. As will also be explained in greater detail hereinafter, in order to draw some more complex or lengthy symbols, means are provided by which a single symbol can be drawn by cycling through the memory more than once; that is, sixteen time periods are employed to draw a first portion of the symbol, and then new information is written into the memory and a subsequent memory cycle comprised of sixteen additional time periods is utilized to draw a further portion of the symbol.

Attention is now called to FIG. 3, which illustrates a block diagram of a portion of the symbol signal source 28 in accordance with the present invention. The output lines of the previously referred to data source 38 are connected to the input of an AND gate 80 forming part of a gating circuit 82. Although only a single output line is illustrated a being connected from source 38 to the AND gate 80, it should be understood that this single line is representative of a plurality of lines, each line intended to carry a different bit of a data input code. Thus, the data input codes will likely be comprised of six bits, for example, to define each of sixty-four different alphanumeric characters. The illustrative AND gate 80 is controlled by the output of the control and timing means 40. The output of the AND gate 80 is connected to the input of an OR gate 84 whose output in turn is applied to a decoder circuit 86. In response to the code provided by the data source 38, the decoder 86 selects one amplifier out of a first group of eight amplifiers A1–A8 and a second amplifier out of a second group of sixteen amplifiers A9–A24. The first and second groups of amplifiers are arranged such that a single one of 128 different memory lines is energized in response to the selection of an amplifier from each of the first and second groups. In the embodiment illustrated in FIGS. 3 and 4, it is assumed that sixteen read lines R1–R16 are required in order to read the sixteen memory core rows to be discussed. Read lines R1–R8 are all connected to the amplifier A9 and to the amplifiers A1–A8. Thus, in order to energize read line R7, for example, amplifiers A7 and A9 are energized by the decoder circuit 86. Read lines R9–R16 are all associated with amplifier A10 and each with a different one of the first group of amplifiers. Thus, as a further example, in order to energize read line R11, decoder circuit 86 energizes amplifiers A10 and A3.

As previously pointed out, it is assumed that sixty four different symbols are to be displayed, and therefore sixty-four different symbol write lines S1–S64 are provided and arranged as illustrated in FIG. 3. As an example, in order to energize symbol write line S24, decoder circuit 86 energizes amplifiers A8 and A13. As a further example, in order to energize symbol write line S41, decoder circuit 86 energizes amplifiers A1 and A16.

Of the 128 memory lines which can be selected by the amplifiers A1–A24 shown in FIG. 3, sixteen of the memory lines comprise read lines and sixty-four comprise symbol write lines, thereby leaving forty-eight extra lines which, in the embodiment shown, will be utilized for recycling purposes. As will be explained in greater detail hereinafter, in order to select one of the extra forty-eight lines E1–E48 for recycling purposes, a recycle address register 90 is provided. The recycle address register 90 will address one of the forty-eight extra lines through AND gate 92 as controlled by the control and timing means 40. The output of AND gate 92 is connected to the input of OR gate 84, which, as previously noted, supplies signals to the decoder circuit 86. The output of the control and timing means 40 is also connected to the input of OR gate 84 for the purpose of successively selecting the read lines R1–R16 for reading out during each of the sixteen display periods periods the information defining a point toward which the beam should be moved.

Figure 4:
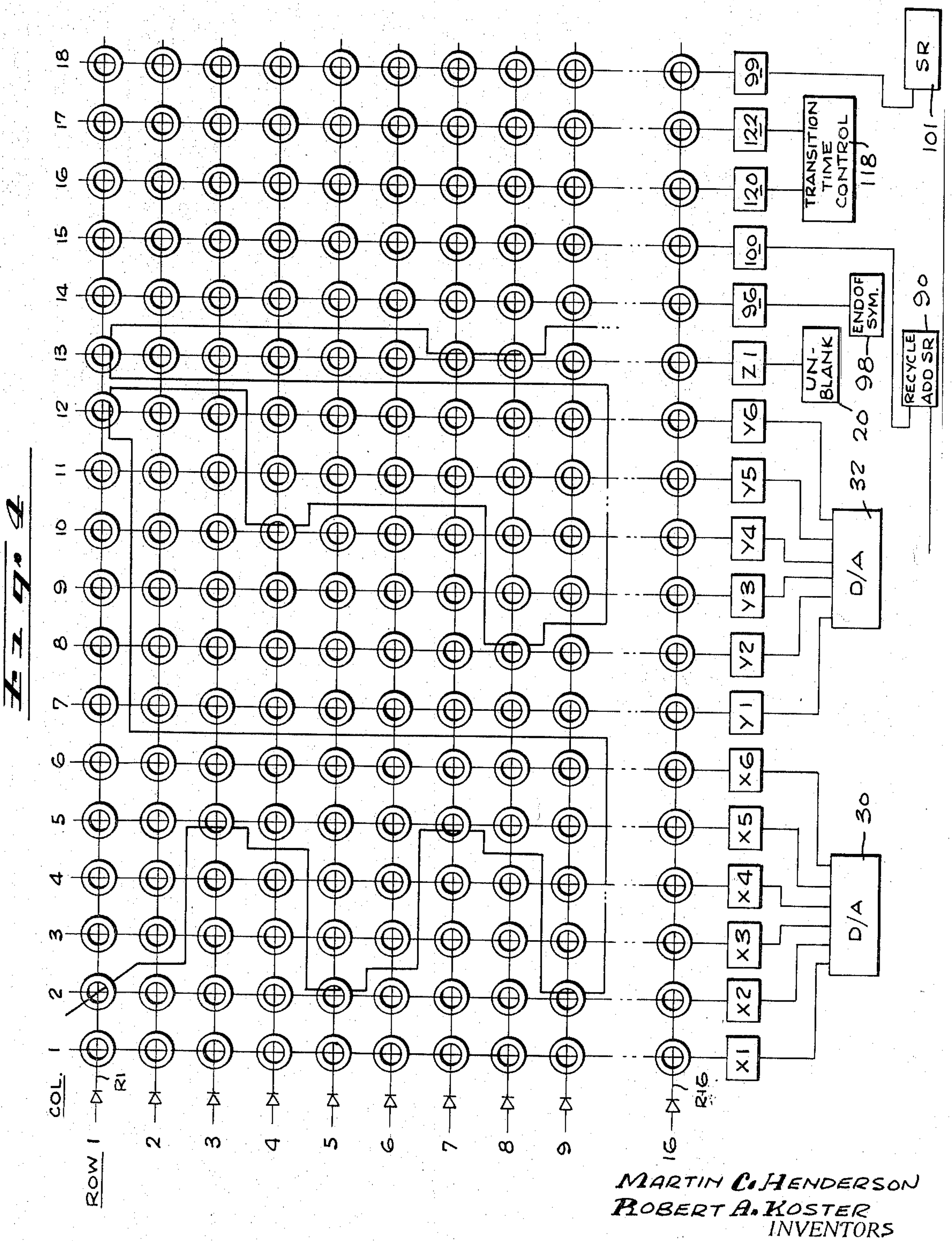
FIG. 4 illustrates a magnetic core memory utilized in the symbol signal source in accordance with a preferred embodiment of the present invention.

Attention is now called to FIG. 4, which illustrates the magnetic core memory matrix which, as previously assumed, has sixteen rows of memory cores. A different one of the read lines R1–R16 threads each row of memory cores. Seventeen columns of memory cores are illustrated in the preferred embodiment of FIG. 4. Of these, the initial six columns are utilized to provide X deflection information. Columns 7–12 are utilized to provide Y deflection information. Column 13 is utilized to provide Z or unblank information. Column 14 is employed to provide "end of symbol" information. Column 15 is employed to store recycle address information, and columns 16 and 17 are employed to store transition time information for purposes to be discussed hereinafter.

Each of the symbol lines S1–S64 corresponds to a different symbol capable of being displayed by the disclosed system. It should, of course, be appreciated that the number sixty-four is arbitrary and a system in accordance with the invention can easily be made to display each of 128 different symbols. Each of the symbol write lines S1–S64 is uniquely threaded through the core matrix of FIG. 4. FIG. 4 only illustrates in detail the symbol write line utilized for writing information into the memory as depicted by FIG. 2(*b*) for describing the letter B. It will be noted that the symbol write line illustrated in FIG. 4 in row 1 threads through column 2 and column 12 to define coordinates $X=2$, $Y=6$ during time period $t_1$, as specified by the table of FIG. 2(*b*). A different sense line is coupled to the cores of each of the columns, with each sense line in turn being connected to a sense amplifier. Thus the sense lines associated with core columns 1–6 are respectively coupled to sense amplifiers X1–X6. The sense lines associated with columns 7–13 are respectively connected to sense amplifiers Y1–Y6. The sense line coupled to the cores of column 13 is connected to sense amplifier Z1.

As a consequence of threading the symbol write line for the symbol B through the cores of columns 2 and 12 of row 1, sense amplifiers X2 and Y6 will be energized when row 1 is read during time period $t_1$. The outputs of sense amplifiers X1–X6 are all coupled to the input of the digital-to-analog (D/A) converter 30 previously mentioned. Likewise, the outputs of sense amplifiers Y1–Y6 are connected to the input of D/A converter 32 previously mentioned. It will be noted that the symbol write line for "B" is not threaded through any row 2 cores, and therefore the D/A converters, which have a storage capability, hold, during the period $t_2$, the information previously written therein during time period $t_1$. None other of the X and Y sense amplifiers will be pulsed during periods $t_1$ and $t_2$ when read lines R1 and R2 are energized. However, during time period $t_3$, read line R3 will be energized to thereby pulse sense amplifier X5. D/A converter 32 will continue to store the level $Y=6$. During time period $t_4$ read line R4 will be energized to pulse the sense amplifier Y4, while D/A converter 30 will continue to store the level $X=5$. It should also be noted that the symbol write line illustrated in FIG. 4 is threaded through the cores of rows 1, 7, and 8 in order to develop pulses during time periods $t_1$, $t_7$, and $t_8$ to switch the state of the unblanking means 20. Thus, in displaying a "B" the beam will be unblanked during periods $t_1$–$t_7$, blanked during period $t_8$, and unblanked again during period $t_9$.

Accordingly, it should be apparent that by energizing a symbol write line defined by the data code provided by source 38 to thereby write information into the memory defining the manner in which the beam should be moved, and by thereafter sequencing through the memory to read out, during each of sixteen successive time periods, the X, Y, and Z signals as represented in FIGS. 2(*b*) and 2(*c*), the symbol depicted in FIG. 2(*a*) can be displayed.

As will be recalled from FIG. 2(*b*), the symbol depicted thereby is completely displayed by the end of time period $t_{10}$, and thereafter a new symbol can be drawn. In order to enable the system to initiate a new symbol immediately after a previous symbol has been completed rather than after the full sixteen time periods have expired, core column 14 is used to store an "end-of-symbol" indication. Thus, the symbol write line illustrated in FIG. 4 is also preferably threaded through the column 14 core in row 11 (not shown). Thus, a pulse is sensed by the sense amplifier connected to the sense line associated with the cores of column 14, and controls an end-of-symbol processor 98. The end-of-symbol processor 98 can initiate several functions amongst which is to blank the beam and reposition it at the starting point (previously assumed to be $X=2$, $Y=2$) of the next display point matrix.

In the disclosed embodiment of the invention illustrated in FIG. 4, the cores of column 15 are utilized to store the recycle address. Thus, in order to display some symbols which are particularly complex or lengthy and which require more than sixteen different time periods to complete, the invention contemplates drawing a portion of the symbol during a first memory cycle, i.e., sixteen time periods, and then indicating that one of the extra memory lines E1–E48 should be energized to write new information into the memory, after which another memory cycle is executed (sixteen additional time periods) in which a further portion of the symbol is displayed. Column 15 of the core matrix of FIG. 4 is utilized to store the address of the particular one of the forty-eight extra memory lines to be energized for the next cycle. Thus, for each symbol that requires more than one cycle, the symbol word line associated with that symbol is threaded through the cores of column 15 in a manner which defines the address of one of the extra memory lines E1–E48. During the sixteen time periods of the initial memory cycle, the bits of this address are sequentially read out through a sense amplifier 100 into a recycle address shift register 90. At the end of a time period $t_{16}$, the information in the recycle address register will define the extra memory lines E1–E48 to be energized. Thus, as indicated in FIG. 3, the control and timing means 40 will apply the information in the recycle address register 90 to the decoder circuit 86 to thereby energize the addressed extra memory line. Thereafter, the control and timing means 40 will sequence through the sixteen time periods of the subsequent cycle in the usual manner.

In accordance with the preferred embodiment of the invention, information defining symbol spacing can also be stored in the memory. More particularly, it is conventional practice to utilize the same amout of horizontal space for each symbol when displayed on a cathode ray tube. Thus, each successice matrix of display points is normally horizontally displaced from the previous matrix by a fixed distance. Thus, the conventional cathode ray tube display resembles the output of a standard typewriter in that the lines are not justified. In order to produce a cathode ray tube display of better quality and more like typical printing, the displacement of each successive display matrix from the previous matrix can be determined dependent upon the identity of the symbol displayed in the previous matrix. This displacement will be referred to as symbol width.

In the preferred embodiment of the invention, this concept is implemented by dedicating one of the memory matrix columns to symbol width information. More particularly, assume that matrix column 18 is dedicated for this purpose and that each of the symbol write lines is threaded through column 18 to define a code (e.g., binary) which designates the width of the associated symbol or, in other words, how far the next display point matrix should be displaced from the matrix in which the current symbol is described. During the sixteen time periods of each cycle in which the display point information is read out of columns 1–12 of the memory, the symbol width information is read out of column 18 and through sense amplifier 99 into shift register 101. The information in shift register 101 could, in the case of a narrow symbol such as *i*, for example, indicate that the next display point matrix should overlap the present matrix; thus the information in the shift register 101 may define the quantity $-1$ units. On the other hand, where a large symbol such as "W" is displayed, the next display point matrix should be spaced from the prior one by a maximum distance, e.g., $+5$ units.

In order to actually control the symbol width, means (not shown) responsive to the contents of shift register 101 are provided and coupled to the major X deflection amplifier 15 for horizontally displacing the cathode ray tube beam after each symbol is drawn.

Attention is now called to FIG. 5(*a*), which illustrates in solid lines a sharp signal transition between a deflection signal level 103 defined during one time period and a signal level 104 defined during an adjacent time period. In accordance with a feature of the present invention, the sharp signal transition can be converted to any one of a plurality of different modified ramp signals all having different rise times. Thus, the signal transition of FIG. 5(*a*) can be converted to a modified ramp signal 106 having a rise time equal to one time period. Alternatively, the sharp signal transition can be converted to a modified ramp signal 108 or 110 respectively having rise times of two and four periods. Preferably, the modified ramp signals 106, 108, and 110 are similar in shape, all approximating a half cycle of a sine wave, i.e., from $-\pi/2$ to $+\pi/2$.

The present invention recognizes that advantages can be realized from utilizing each of the different modified ramp signals in its proper place. Thus, utilizing a transition time of one time period characteristic of the modified ramp signal 106, the beam can be most rapidly moved between two designated end points. However, utilization of the ramp signal 106 does not permit curves to be drawn as shown in FIG. 2(*a*) inasmuch as the destination point cannot be changed during the traversal of the beam from one end point to another. Utilization of the two transition time period ramp 108 enables curved lines to be drawn as shown in FIG. 2(*a*). However, the ramp 108 may not permit long lines to be drawn without exceeding a reasonable beam speed. The reasonable beam speed depends upon the circuits employed, and if the speed is exceeded, the line image may be unsatisfactorily dim or distorted, e.g., overshoot. In addition, if the two transition time ramp 108 is utilized to draw long lines without exceeding a reasonable speed, it may be necessary to define intermediate points. In order to avoid these consequences, the ramp 110 having a transition time of four time periods can be employed. Utilization of the ramp 110 permits long lines to be drawn by merely defining the end points; i.e., without requiring intermediate points to be defined and without exceeding beam speed. It should, of course, be realized that intermediate points, like any other points, are defined by threading the symbol write lines through the corresponding cores of the matrix of FIG. 4. By avoiding the requirement of defining intermediate points, less core threading is required, which considerably simplifies the fabrication of the core memory and may in fact permit a reduction in size where the core window area represents a limiting factor. That is, it should be appreciated that, inasmuch as the sixty-four symbol write lines plus the forty-eight extra write lines are threaded through the cores of FIG. 4, the core window area of certain ones of the cores may be insufficient to receive all of the lines intended to be threaded therethrough. In this event, auxiliary core columns can be provided. For example, if the cores of column 2 of the matrix of FIG. 4 cannot receive all of the lines intended to be threaded therethrough, an additional column of cores can be provided coupled to a sense line which also feeds the sense amplifier X2.

In order to implement the selective transition time feature of the invention as shown in FIG. 5(*a*), the digital-to-analog converters 30 and 32 of FIGS. 1 and 4 are each coupled to waveshaper circuits 34 and 36 (FIG. 5(*b*)) as previously mentioned. Each waveshaper circuit has included therein first, second, and third waveshaping means 112, 114, and 116 each adapted to shape a sharp signal transition, as shown in FIG. 5(*a*), into a different one of the modified ramp signals 106, 108, or 110. The particular waveshaping means 112, 114, or 116 of each waveshaper circuit 34 and 36 selected to operate upon the signal transition provided by the digital-to-analog converter connected thereto is determined by the output of a transition time control means 118. More particularly, the transition time control means 118 is provided with three output lines. If the first of these output lines is energized, the wave shaping means 112 in each of the waveshaper circuits will be enabled to thus define a transition time equal to one time period. Similarly, if the second or third output lines of the transition time control means 118 is energized, the means 114 and 116 will be respectively enabled to respectively define transition times equal to two or four time periods.

The transition time control means is controlled in response to information read from columns 16 and 17 of the core matrix of FIG. 4. More particularly, the symbol write lines and extra lines are threaded through the cores in columns 16 and 17 to define a binary code for each time period in which the transition time being employed is to be modified. It should be clear that two cores are sufficient to define four binary codes of which three are used to define one of three different transition times. Preferably, the transition time control means has a storage capability so as to thereby require the lines to thread the cores of columns 16 and 17 only in order to change the transition time being employed. As previously explained, this technique reduces the amount of core wiring required.

Figure 6C:
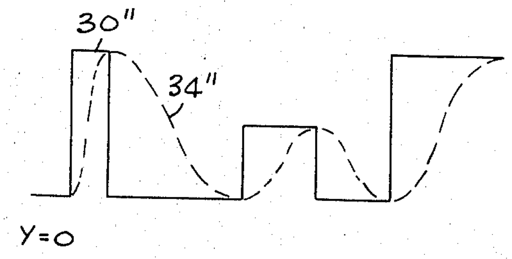
FIG. 6(*a*) illustrates another symbol to be displayed.
Figure 6D:
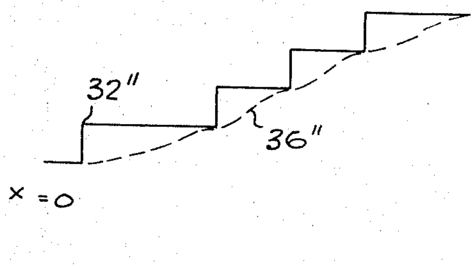

In order to better appreciate the system's capability of permitting different transition times to be selectively defined, attention is now called to FIG. 6. FIG. 6(*a*) illustrates the symbol "W" displayed on a 6 x 6 matrix. FIG. 6(*b*) illustrates in tabular form the information read from the core memory of FIG. 4 used for controlling the beam to describe the symbol of FIG. 6(*a*), and FIG. 6(*c*) illustrates the deflection signal waveforms resulting from the information of FIG. 6(*b*) read from the memory.

At time $t_0$, assume that the beam is at the previously referred to starting point 130 ($X=2$, $Y=2$). At time $t_1$ the point 132 ($X=2$, $Y=6$) is defined together with a transition time equal to one time period. By defining a transition time equal to one time period, it is recognized that the beam must be moved very rapidly, and as a consequence a dim and perhaps distorted line may result. However, inasmuch as the beam is blanked in traversing the distance between the points 130 and 132, a poor line can be tolerated in this instance. During time period $t_2$ the point 134 is defined ($X=3$, $Y=2$). The beam is unblanked and a transition time equal to four time periods is defined. Note that the destination point 134 ($X=3$, $Y=2$) is maintained for four time periods (i.e., $t_2$–$t_5$). As a consequence, at the end of time period $t_5$ the beam will have reached the destination point 134. By holding the destination point through four time periods and defining a transition time equal to four time periods, the beam can be moved over a rather long path from point 132 to point 134 at a rate substantially within the limits of the circuits employed. This demonstrates the utility of being able to define a long transition time. That is, if a transition time equal to only two time periods were the only transition time available, the beam would have to be moved very rapidly between points 132 and 134, and as a consequence the limits of the various circuits could be exceeded. As previously noted, in some instances a transition time equal to two time periods may be sufficient to draw a long line if intermediate points are defined. However, in the case of the left side of the symbol "W," it should be clear that no intermediate points could be defined because none of the display matrix points are intersected between points 132 and 134. It is reiterated that, although the destination point 134 ($X=3$, $Y=2$) is held throughout four time periods, the memory of FIG. 4 need not supply this information during each of those time periods; that is, the digital-to-analog converters 30 and 32 have a storage capability which requires that new information be provided thereto only in order to effect a change. Thus, information must be provided to the converters 30 and 32 at the beginning of time period $t_2$ and then again at the beginning of time period $t_6$. In the interim, no information need be provided from the memory. As a consequence, this means that the symbol write line associated with the symbol "W" need not be threaded through any of the cores in rows 3, 4 and 5 of the matrix.

During time period $t_6$ the point 136 ($X=4$, $Y=4$) is defined, the beam is left unblanked, and a transition time equal to two is defined. The same point 136 is defined during time period $t_7$, and as a consequence, at the end of time period $t_7$, the beam in fact arrives at point 136. The point 138 ($X=5$, $Y=2$) is then defined during time periods $t_8$ and $t_9$, with the beam remaining unblanked and a transition time equal to two time periods being defined. Subsequently, during time periods $t_{10}$–$t_{13}$, the point 140 ($X=6$, $Y=6$) is defined. The beam is left unblanked, and a transition time equal to four time periods is defined. During time period $t_{14}$ a pulse is provided to the end-of-symbol means 98 to thereafter blank the beam and reposition it for drawing a subsequent symbol.

FIGS. 6(*c*) and 6(*d*) illustrate the deflection signal waveforms corresponding to the information presented in tabular form in FIG. 6(*b*). Note that the solid lines in FIG. 6(*c*) represent the signal levels out of the digital-to-analog converters 30 and 32. The dotted lines represent the modified signals out of the waveshaper circuits 34 and 36 of FIG. 5(*b*).

Figure 7:
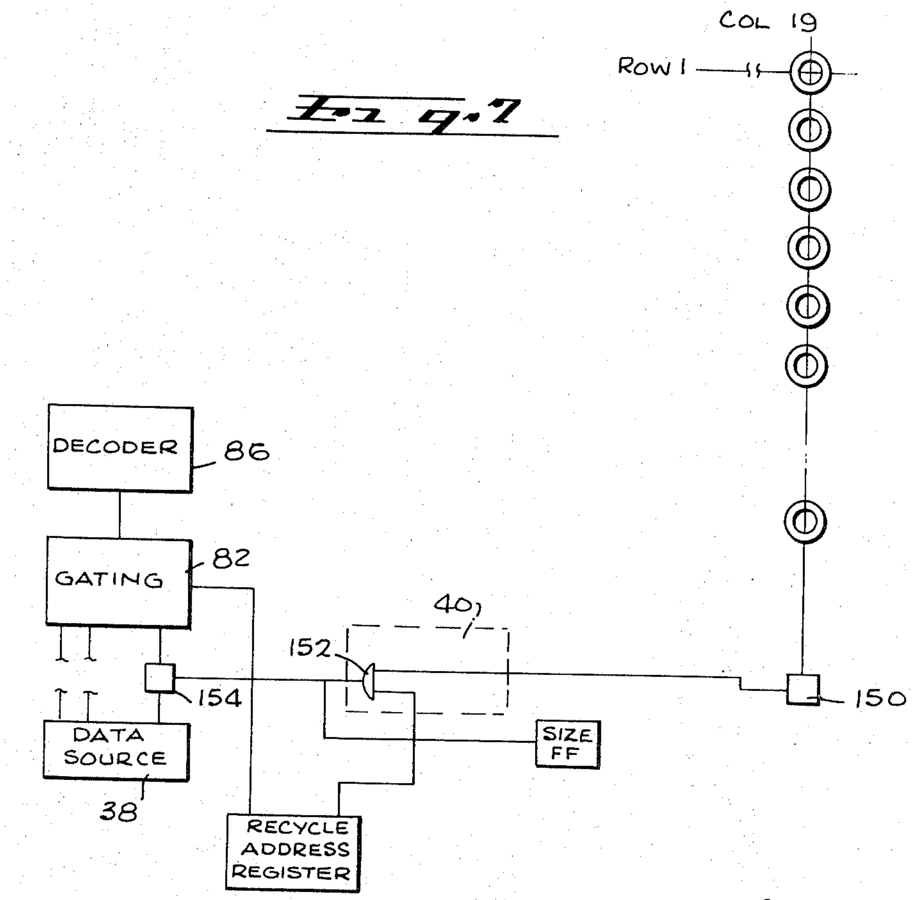
FIG. 7 is a block diagram illustrating a modification of the apparatus of FIGS. 3 and 4 which may be useful for permitting some symbol write lines, each normally responsive to a different data input code identifying a specific symbol, to be used in accordance with the recycle feature of the present invention.

Attention is now called to FIG. 7, which illustrates a modification of the apparatus of FIGS. 3 and 4 which enables the recycle feature to be employed even in situations where the number of different symbols to be displayed plus the number of time periods or read lines required is equal to the maximum number of choices afforded by the matrix of FIG. 3, i.e., amplifiers A1–A24. In other words, utilizing the same quantities as were employed in the apparatus of FIGS. 3 and 4, again assume that of the 128 memory lines which can be selected by the amplifiers A1–A24, sixteen constitute read lines R1–R16. This leaves 112 memory lines to be utilized as symbol write lines and as extra lines. Assume, however, that 112 different symbols are capable of being displayed. In other words, assume that the data source 38 can define 112 different input codes, each intended to identify a different symbol. However, as is the case in many practical situations, further assume that of these 112 different symbols at least some are duplicates except for differences in size. In other words, let it be assumed that of the 112 different codes which can be provided by the data source 38, 100 of them identify a symbol of one size and twelve of the codes identify symbols of a larger size each having a smaller size counterpart definable by one of the other 100 codes. The system modification represented by FIG. 7 is based on the concept that the twelve memory lines associated with the twelve codes defining larger size symbols can in fact be made available for recycling purposes if some means is provided for sensing when one of these twelve memory lines is addressed by the data source. In response to the data source addressing one of these twelve memory lines, the size flip-flop is set and the information provided by the data source is modified to the code for the smaller symbol counterpart. Thereafter, the symbol write line associated with the corresponding smaller symbol is energized to write the necessary beam control information into the memory. The symbol then displayed by subsequently reading the memory is displayed in large size as a consequence of the size flip-flop having been set. As a consequence of operating the system in this manner, the twelve write lines which would otherwise have to be utilized for writing information into the memory defining the large size symbol can be utilized to write recycle information. Any one of these twelve lines can be energized in response to the recycle address register as aforedescribed. When any one of the twelve lines is energized in response to being addressed by the recycle address register, the previously referred to action of setting the size flip-flop and subsequently energizing another write line is prevented.

In order to implement the aforedescribed technique, in accordance with the apparatus of FIG. 7, an additional column, i.e., column 19, of cores is introduced into the core matrix of FIG. 4. Each of the memory lines addressed by one of the data source codes identifying one of the large size symbols is threaded through one of the cores in column 19. As a consequence, in response to one of these twelve codes being provided by the data source of FIG. 7, a memory write line will be energized which will cause a core in column 19 to switch. A sense line coupled to all the cores of column 19 is connected to a sense amplifier 150. The output of the sense amplifier 150 is coupled to the input of a gate 152 in the control and timing means. In addition, the output of the recycle address register is also coupled to the input of AND gate 152. If the recycle address register is empty, indicating that the data source, rather than the recycle address register, is addressing one of the twelve large symbol lines, the gate 152 will be enabled. The output of gate 152 is connected to the input of the size flip-flop so as to set the flip-flop to subsequently control the gain of the amplifiers 16 and 18 of FIG. 1. In addition, the output of gate 152 modifies the code provided by the data source. For this purpose, it is convenient to utilize similar codes for corresponding large and small size symbols so that a minimum code modification is required to change a code from identifying a large to a small size symbol. As an example, let it be assumed that the data source provides seven bit codes with the least significant bit defining the size bit in all of the codes identifying corresponding large and small symbols. That is, if the six most significant bits in the codes identifying the large and small size of a common symbol are identical, and the size is represented only by the least significant bit, then the output of the gate 152 need only change the state of the least significant bit to cause the write line corresponding to the smaller size symbol to be addressed. Thus, the output of gate 152 is connected to an actuatable inverter 154 connected in the least significant bit output line of the data source. The output of the data source is, of course, coupled through gating circuitry 82 to the decoder 86. By changing the code provided by the data source 38 by actuating the inverter 154, the decoder 86 will automatically thereafter select the newly addressed symbol write line corresponding to the small size symbol.

It is, of course, important to erase any information entered into the memory by initially energizing one of the twelve large symbol write lines. In order to assure this, each corresponding small symbol write line is threaded through the memory both to define information representing the symbol it identifies and to erase information previously recorded by the energization of the corresponding large symbol line. The energized small symbol line can be threaded through the same cores through which the corresponding large symbol line is threaded in an opposite sense. Thus, after the large symbol line is energized to write "1's" in selected cores, energization of the corresponding small symbol line will erase those "1's" as it enters new information corresponding to the symbol to be displayed. The information entered by energization of the large symbol line, of course, comprises the recycle information utilized to form subsequent portions of long or complex symbols. When any of these twelve large symbol lines is energized as a consequence of the recycle address register providing an address to the decoder 86 through the gating circuit 82, the gate 152 will be disabled so that the output of the sense amplifier 150 will be ignored.

The concept of recycling through the memory to define a larger or more complex symbol in response to the provision of a code from the data source can be extended in accordance with a further aspect of the invention to permit a group of symbols or a word to be defined. More particularly, it has been recognized that a relatively small number of words are used with great frequency in general text. This situation becomes even more prevalent as the text field narrows. Thus, if the text material is related to a relatively specific field such as "retail department stores" or "military," it can be seen that a relatively small number of words, e.g., twenty, may account for more than 50% of the total number of words used in the text relating to that field. It follows that in the digital handling of text material, significant savings can be realized if selected codes are provided to identify words, i.e., a sequence of symbols, while other similar codes are used to identify individual symbols.

Figure 8:
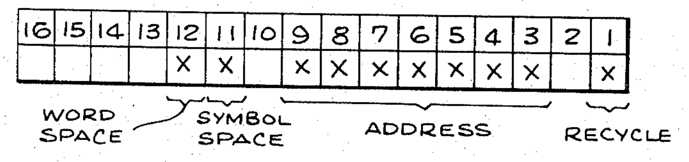
FIG. 8 is a diagram illustrating a typical recycle information format.

In order to demonstrate this concept further, consider that it is desired to utilize one of the aforementioned 128 seven-bit codes to identify the word "THE," i.e., the sesequence of symbols "T," "H," and "E," with symbol spaces being defined after symbols "T" and "H" and a a word space being defined after symbol "E." Let this code be identified as $C_{THE}$. In response to code $C_{THE}$ being supplied by the data source 38 to the decoding means 86, one of the 128 different lines threaded through the memory will be energized. Let it be assumed that extra line E1 is energized in response to code $C_{THE}$. Energization of line E1 preferably automatically causes the symbol write line corresponding to the symbol "T" to be energized, which symbol write line, in the preferred embodiment of the invention, lies in the same horizontal row of the matrix of FIG. 3 as the line E1. Thus, let it be assumed for the present that energization of line E1 automatically energizes symbol write line S17 which defines the symbol "T." Energization of the write line E1 writes information into column 15 of the core matrix of FIG. 4 defining a recycle operation, the memory line to be energized for the next memory cycle, and the spacing (Symbol or word) to be defined. More particularly, FIG. 8 illustrates the format of data read out of matrix column 15 and stored in the recycle address shift register 90 after the sixteen periods of a memory cycle. Note that bit position 1 defines whether or not a recycle operation is to be executed. Bit positions 3–9 store the seven-bit code defining the memory line to be energized during the next cycle. Bit position 11 defines whether or not the major X deflection amplifier 15 should shift the cathode ray tube beam by a symbol space, and bit position 12 defines whether or not the major X deflection amplifier 15 should shift the beam by a word space. Means (not shown) responsive to bit positions 11 and 12 of the recycle shift register 90 are coupled to the major X deflection amplifier.

The seven-bit code read into bit positions 3–9 of the shift register 90 in response to the energization of line E1 will designate another extra line, e.g., line E2. When line E2 is energized during the next memory cycle, it will automatically also energize the symbol write line defining the next symbol in the sequence, i.e., "H." During the next sixteen time periods, the information required to move the beam to describe the symbol "H" is read out, while the shift register 90 is also being filled to define, e.g., extra line E3 for the next memory cycle. Energization of line E3 automatically energizes the symbol write line defining the symbol "E" so that during the next sixteen time periods the symbol "E" is described. During this last memory cycle, no recycle information will be read into the recycle shift register 90, and thus the end-of-symbol bit read by end-of-symbol processor 98 will reposition and blank the beam and signal that the apparatus is ready for more input data. On previous memory cycles which called for a recycle operation, the functioning of the end-of-symbol processor is inhibited.

Figure 9:
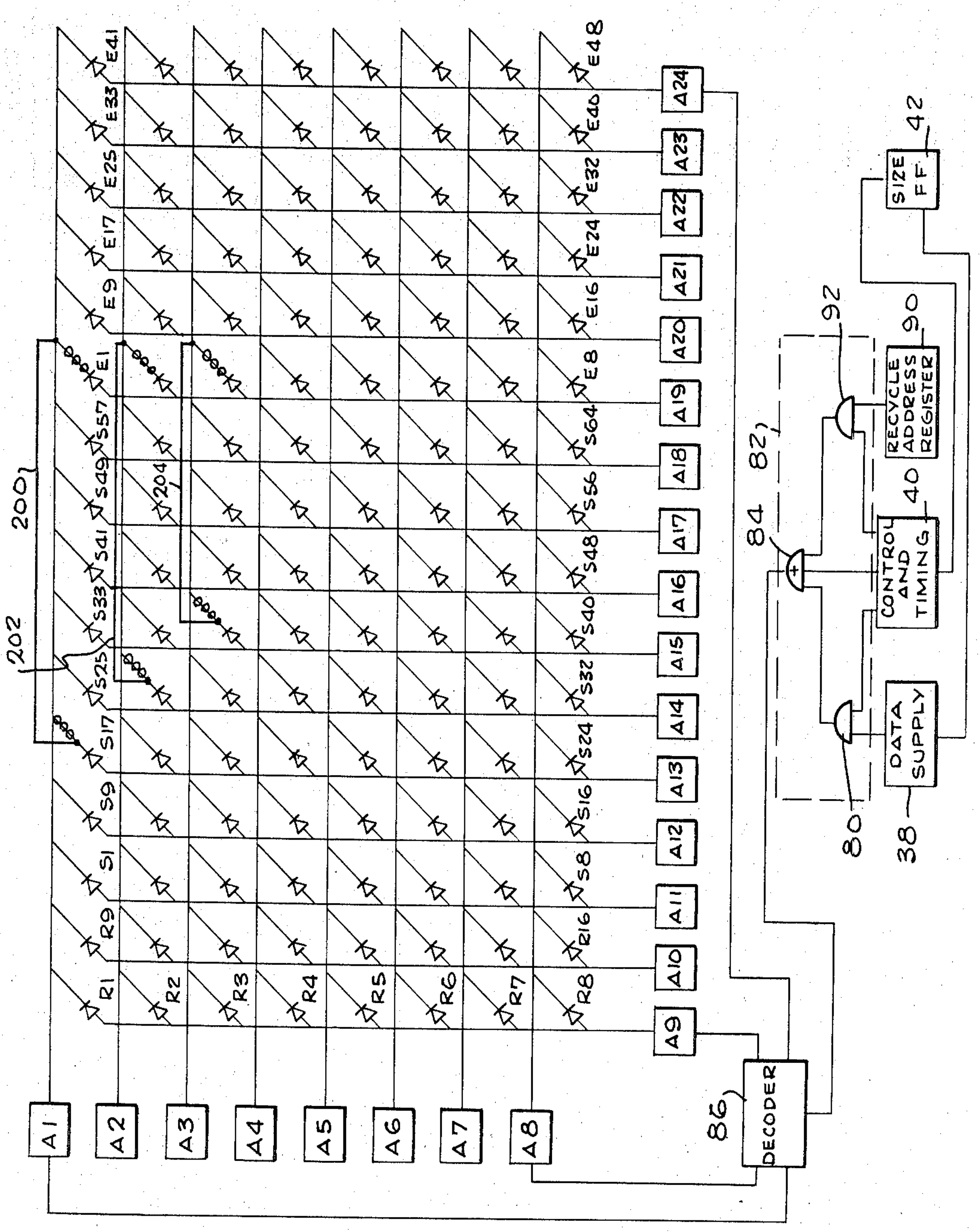
FIG. 9 is a block diagram illustrating how the apparatus of FIG. 3 can be modified to better enable it to display words.

It has been stated that the energization of extra line E1, for example, automatically energized the appropriate symbol write line, e.g., S17. FIG. 9 illustrates a preferred implementation for accomplishing this. Note that FIG. 9 is identical to FIG. 3 except that conductors 200, 202, and 204 have been incorporated. Note that conductor 200 couples line E1 to line S17, conductor 202 couples line E2 to line S26, and conductor 204 couples line E3 to line S35. Thus, when amplifiers A19 and A1 are both energized, both lines E1 and S17 are energized. It should also be noted that line S17 can be energized without energizing line E1 when it is desired to draw the symbol "T" but not the word "THE." This is done, of course, by energizing amplifiers A13 and A1.

Although the implementation of FIG. 9 constitutes a preferred embodiment of the invention, it should be recognized that other techniques can also be employed. For example, the previously described technique for recycling as implemented in FIG. 7 could be used to automatically energize a particular symbol write line in response to the energization of an extra line. It will be recalled that in FIG. 7 the provision of certain input codes from the data source were immediately recognized, and as a consequence the data source code was modified. It should be apparent that this technique can be utilized for word display purposes, e.g., in response to code $C_{THE}$, line E1 could be energized to write the recycle information into memory, and the code $C_{THE}$ could then be immediately modified to define line S17. It will, of course, be recognized that whether the system of FIG. 7 or FIG. 9 is employed, the various codes should be selected with care in order to insure satisfactory operation.

From the foregoing, it should be appreciated that an improved display system has been disclosed herein which permits a visible means to be deflected toward particular points of a display matrix during each of a plurality of successive time periods. Information defining the sequence of display points toward which the visible means is deflected is read from a memory, after the information is written into the memory by a particular one of a plurality of wired-in symbol write lines identified by a data input code. In addition to the basic concept of the invention, several additional features are of particular significance. Initially, in accordance with one aspect of the invention, means are provided for recycling through the memory in order to obtain information describing larger or more complex symbols. Thus, where sixteen time periods, for example, are not sufficient to fully described a particular symbol, a subsequent cycle is initiated after writing information into the memory with a write line identified by information accessed from the memory during the initial cycle. In this manner, two memory cycles can, for example, be utilized to provide thirty-two time periods for describing a symbol. In accordance with another significant aspect of the invention, means are provided for selectively designating a signal transition time in order to enable curved lines to be drawn and for the purpose of assuring that the beam can be moved at a rate within the limits of the circuitry employed.

The embodiments of the invention in which an exclusive property or privilege is claimed are defined as follows:

1. A symbol generating system useful in combination with (1) a data source identifying a sequence of symbols and (2) a device including a target having a plurality of points therein and means deflectable toward each of said points for forming a visible image on said target, said system comprising:

a digital memory;

timing means defining a cycle comprised of a plurality of successive time periods;

write means responsive to a symbol identified by said data source for storing horizontal and vertical coordinate information in said memory defining selected points, in a matrix of points, toward which said deflectable means should be deflected and transition time control information for defining an intended transition time, equal to one or more of said time periods, of said deflectable means between successively defined points;

read means for reading a different portion of said stored information from said memory during each of said time periods, said portions of stored information including said horizontal and vertical coordinate information, defining a point either the same as or different from a point defined by information read during a prior time period, and said transition time control information;

first and second digital-to-analog converters respectively responsive to said horizontal and vertical coordinate information read during successive time periods for forming horizontal and vertical analog deflection signals comprised of different signal levels coupled by sharp signal transitions; and first and second wave shaping means respectively responsive to said horizontal and vertical analog deflection signals for converting each of said sharp signal transitions into a signal transition having a rise time determined by said transition time control information read from said memory.

2. The system of claim 1 wherein said write means responsive to said data source also stores information in said memory defining the distance from said identified symbol at which a succeeding symbol is to be displayed.

3. The system of claim 1 wherein each of said first and second wave shaping means includes at least first and second selectively actuatable means for respectively converting said sharp signal transitions into first and second signal transitions having rise times sufficient to complete each of said signal transitions in one and two time periods, respectively.

4. The system of claim 3 wherein said wave shaping means includes a third selectively actuatable means for converting each of said sharp signal transitions to a third signal having a rise time sufficient to complete said signal transition in four time periods.

5. The system of claim 1 wherein said write means includes a plurality of write lines, each unique to a different symbol capable of being displayed and each individually energizable to write unique information into said memory.

6. The system of claim 5 wherein said memory comprises a magnetic core matrix and wherein each of said write lines is uniquely threaded through said magnetic core matrix.

7. The system of claim 6 wherein said magnetic core matrix is comprised of a plurality of rows and columns, and wherein said read means reads a different one of said rows during each of said time periods.

8. The system of claim 5 wherein at least one of said write lines writes recycle information into said memory identifying another one of said write lines to be energized during a subsequent cycle defined by said timing means.

9. The system of claim 5 wherein said source of input data is capable of providing a plurality of different codes, and wherein said system additionally includes:

means responsive to each of said different codes for energizing a different one of said write lines; and means responsive to the initial energization of at least one of said write lines for de-energzing that line and energizing another one of said write lines.

10. The system of claim 9 wherein at least first and second ones of said codes represent the same symbol but of different size, and wherein said system additionally includes:

means responsive to said first code for energizing a first write line;

means responsive to said second code for energizing a second write line;

a size flip-flop; and means responsive to the initial energization of said second write line for de-energizing said second write line, energizing said first write line, and providing a signal to said size flip-flop.

11. A symbol generating system useful in combination with (1) a data source identifying a sequence of symbols and (2) a device including a target having a plurality of points therein and means deflectable toward each of said points for forming a visible image on said target, said system comprising:

a digital memory;

timing means defining a cycle comprised of a plurality of successive time periods;

write means responsive to a symbol identified by said data source for storing horizontal and vertical coordinate information in said memory defining selected points, in a matrix of points toward which said deflectable means should be deflected and recycle information identifying information to be stored in said memory during a subsequent cycle defined by said timing means;

read means for reading a different portion of said stored information from said memory during each of said time periods, said portions of stored information including said horizontal and vertical coordinate information and said stored recycle information;

first and second means respecitvely responsive to said horizontal and vertical coordinate information read during successive time periods for forming horizontal and vertical analog deflection signals for application to said device; and means responsive to said recycle information read from said memory for subsequently storing information identified thereby in said memory.

12. The system of claim 11 wherein said recycle information read from said memory includes space information for defining the gross positioning of said deflectable means during a succeeding cycle.

13. A symbol display system comprising:
a display device including a target having a plurality of points therein and a means deflectable to each of said points for forming a visible image thereat;
a data source for providing coded information identifying a sequence of symbols to be displayed by said display device;
a digital memory;
means defining a plurality of successive time periods;
write means responsive to a symbol identified by said data source for storing horizontal and vertical coordinate information in said memory defining selected points, in a matrix of points, toward which said deflectable means should be deflected and transition time control information for defining an intended transition time, equal to one or more of said time periods, of said deflectable means between successively defined points;
read means for reading a different portion of said stored information from said memory during each of said time periods, said portions of stored information including said horizontal and vertical coordinate information, defining a point either the same as or different from a point defined by information read during a prior time period, and said transit time control information;
first and second digital-to-analog converters respectively responsive to said horizontal and vertical coordinate information read during successive time periods for forming horizontal and vertical analog deflection signals comprised of different signal levels coupled by sharp signal transitions; and
first and second wave shaping means respectively responsive to said horizontal and vertical analog deflection signals for converting each of said sharp signal transitions into a signal transition having a rise time determined by said transition time control information read from said memory.

14. A symbol generating system useful in combination with (1) a data source capable of providing a plurality of different codes each identifying a different symbol and (2) a device including a target having a plurality of points therein and means deflectable toward each of said points for forming a visible image on said target, said system comprising:
a digital memory;
timing means defining a cycle comprised of a plurality of successive time periods;
write means responsive to a symbol identified by said data source for storing horizontal and vertical coordinate information in said memory defining selected points, in a matrix of points, toward which said deflectable means should be deflected;
read means for reading a different portion of said stored information from said memory during each of said time periods, said portions of stored information including said horizontal and vertical coordinate information;
said write means including a plurality of write lines, each unique to a different symbol capable of being displayed and each individually energizable to write unique information into said memory;
means responsive to each of said different codes for energizing a different one of said write lines; and
means responsive to the initial energization of at least one of said write lines for de-energizing that line and energizing another one of said write lines.

15. The system of claim 14 wherein at least first and second ones of said codes represent the same symbol but of different size, and wherein said system additionally includes:
means responsive to said first code for energizing a first write line;
means responsive to said second code for energizing a second write line;
a size flip-flop; and
means responsive to the initial energization of said second write line for de-energizing said second write line, energizing said first write line, and providing a signal to said size flip-flop.

References Cited

UNITED STATES PATENTS

| | | | |
|---|---|---|---|
| 3,289,195 | 11/1966 | Townsend | 340—324.1 |
| 3,329,948 | 7/1967 | Halsted | 340—324.1 |
| 3,417,281 | 12/1968 | Stauffer | 340—324.1 |
| 3,329,947 | 7/1967 | Larrowe et al. | 340—324.1 |
| 3,334,304 | 8/1967 | Fournier et al. | 340—324.1 |
| 3,335,415 | 8/1967 | Conway et al. | 340—324.1 |
| 3,364,479 | 1/1968 | Henderson et al. | 340—324.1 |

DONALD J. YUSKO, Primary Examiner
M. M. CURTIS, Assistant Examiner

U.S. Cl. X.R.

315—18